US011754516B2

(12) United States Patent
Tsukada et al.

(10) Patent No.: US 11,754,516 B2
(45) Date of Patent: Sep. 12, 2023

(54) NONDESTRUCTIVE TEST SYSTEM COMPRISING A NEUTRON EMISSION UNIT FOR EMITTING FAST NEUTRONS AND A NEUTRON DETECTION UNIT FOR DETECTING THERMAL NEUTRONS, AND NONDESTRUCTIVE TEST METHOD

(71) Applicants: Topcon Corporation, Tokyo (JP); RIKEN, Wako (JP)

(72) Inventors: Hisashi Tsukada, Tokyo (JP); Shigenori Nagano, Tokyo (JP); Yoshie Otake, Wako (JP); Hideyuki Sunaga, Wako (JP); Yuichi Yoshimura, Wako (JP); Koji Ikado, Wako (JP)

(73) Assignees: Topcon Corporation, Tokyo (JP); RIKEN, Wako (JP)

( * ) Notice: Subject to any disclaimer, the term of this patent is extended or adjusted under 35 U.S.C. 154(b) by 49 days.

(21) Appl. No.: 17/310,845

(22) PCT Filed: Feb. 27, 2020

(86) PCT No.: PCT/JP2020/008171
§ 371 (c)(1),
(2) Date: Aug. 26, 2021

(87) PCT Pub. No.: WO2020/175653
PCT Pub. Date: Sep. 3, 2020

(65) Prior Publication Data
US 2022/0128489 A1 Apr. 28, 2022

(30) Foreign Application Priority Data
Feb. 27, 2019 (JP) .................. 2019-034642

(51) Int. Cl.
G01N 23/204 (2006.01)
G01V 5/00 (2006.01)
(Continued)

(52) U.S. Cl.
CPC .......... *G01N 23/204* (2013.01); *G01N 23/20* (2013.01); *G01N 23/202* (2013.01);
(Continued)

(58) Field of Classification Search
CPC .... G01N 23/005; G01N 23/02; G01N 23/025; G01N 23/04; G01N 23/05; G01N 23/202;
(Continued)

(56) References Cited

U.S. PATENT DOCUMENTS 3,955,087 A    5/1976  Ashe
4,864,142 A *  9/1989  Gomberg ............. G01V 5/0025
                                              378/57
(Continued)

FOREIGN PATENT DOCUMENTS

JP    H11-160254 A    6/1999
JP    2002-221503 A   8/2002
(Continued)

OTHER PUBLICATIONS

An English translation of JP5286411 B2 (WO2011/108709 A1) by Patent Translate. (Year: 2022).*
(Continued)

*Primary Examiner* — Allen C. Ho
(74) *Attorney, Agent, or Firm* — CHIESA SHAHINIAN & GIANTOMASI PC

(57) ABSTRACT

A neutron emission unit is configured to emit neutrons such that a center axis (Nh) of a neutron emission intersects a center axis direction of collimators (23a to 23e). A calculation unit is capable of generating information about an inspection object in the center axis direction of the collimators, based on position information of a neutron detector and/or position information of the neutron emission unit, information about an angle (θ1) at which the center axis of the neutron emission intersects the center axis direction of (Continued)

the collimators, and a neutron amount detected by the neutron detector.

20 Claims, 13 Drawing Sheets

(51) Int. Cl.
   *G01N 23/20* (2018.01)
   *G01N 23/202* (2006.01)
(52) U.S. Cl.
   CPC ... *G01V 5/0025* (2013.01); *G01N 2223/1063* (2013.01); *G01N 2223/1066* (2013.01); *G01N 2223/316* (2013.01); *G01N 2223/646* (2013.01)
(58) Field of Classification Search
   CPC ........... G01N 23/204; G01N 2223/053; G01N 2223/054; G01N 2223/106; G01N 2223/1063; G01N 2223/1066; G01N 2223/646; G01N 2223/316; G01V 5/0025
   USPC .............................. 250/269.4, 269.5, 370.05
   See application file for complete search history.

(56) References Cited

U.S. PATENT DOCUMENTS

| | | | | |
|---|---|---|---|---|
| 7,023,956 B2* | 4/2006 | Heaton | ................ | G01V 5/0033 378/57 |
| 7,405,409 B2* | 7/2008 | Kearfott | .................... | G01T 3/00 250/390.04 |
| 7,573,044 B2* | 8/2009 | Norris | .................. | G01V 5/0069 250/390.04 |
| 8,586,939 B2* | 11/2013 | Bingham | .............. | G01V 5/0008 250/390.02 |
| 9,151,722 B2* | 10/2015 | Alzaidi | ................. | G01N 23/204 |
| 9,442,083 B2 | 9/2016 | Turner et al. | | |
| 10,098,218 B2 | 10/2018 | Yamamoto et al. | | |
| 10,126,257 B2* | 11/2018 | Silarski | ................ | G01V 5/0016 |
| 10,241,061 B2 | 3/2019 | Otake et al. | | |
| 11,067,517 B2* | 7/2021 | Izhutov | ................... | G01N 23/05 |
| 11,513,084 B2* | 11/2022 | Nagano | ................ | G01N 23/204 |
| 11,614,415 B2* | 3/2023 | Nagano | .................. | G01N 23/09 250/390.01 |
| 2013/0206985 A1 | 8/2013 | Turner et al. | | |
| 2017/0223815 A1 | 8/2017 | Yamamoto et al. | | |
| 2018/0259462 A1 | 9/2018 | Otake et al. | | |

FOREIGN PATENT DOCUMENTS

| | | |
|---|---|---|
| JP | 2013-174587 A | 9/2013 |
| WO | 2011108709 A1 | 9/2011 |
| WO | 2016035151 A1 | 3/2016 |
| WO | 2017043581 A1 | 3/2017 |

OTHER PUBLICATIONS

An English translation of JPH11160254 A by Patent Translate. (Year: 2022).*
International Search Report and Written Opinion dated Jun. 9, 2020, in connection with International Patent Application No. PCT/JP2020/008171, filed Feb. 27, 2020, 11 pgs. (including translation).

* cited by examiner

NONDESTRUCTIVE TEST SYSTEM COMPRISING A NEUTRON EMISSION UNIT FOR EMITTING FAST NEUTRONS AND A NEUTRON DETECTION UNIT FOR DETECTING THERMAL NEUTRONS, AND NONDESTRUCTIVE TEST METHOD

CROSS-REFERENCE TO RELATED APPLICATIONS

This application is a national stage of International Patent Application Serial No. PCT/JP2020/008171, filed Feb. 27, 2020, which claims priority to Japanese Patent Application Serial No. 2019-034642, filed Feb. 27, 2019, the disclosures of both are incorporated herein by reference in their entirety.

TECHNICAL FIELD

The present disclosure relates to a non-destructive inspection system and a non-destructive inspection method for an inspection object using radiation.

BACKGROUND ART

In recent years, it has been desired to appropriately maintain, repair, or renew aging infrastructure (hereinafter, referred to as infrastructure constructions) such as roads, bridges, tunnels, and building structures.

To inspect such an infrastructure construction, non-destructive inspection is performed using radiation, such as X-rays, penetrating an object. This non-destructive inspection allows an internal structure of an inspection object to be analyzed without destroying the inspection object.

In particular, in recent years, apparatuses for non-destructive inspection using neutrons, which are more penetrating than X-rays, have also been studied. For example, Patent Document 1 discloses a configuration in which a portable neutron generation source is mounted on a vehicle, and non-destructive inspection of the inside of a bridge is performed using the neutrons while the vehicle travels on the bridge.

CITATION LIST

Patent Document

Patent Document 1: International Patent Publication No. WO2016/035151

SUMMARY OF THE INVENTION

Technical Problem

The non-destructive inspection using neutrons of Patent Document 1 allows inspection of the presence of a defect at a position facing the neutron detector. However, specifying at which position in the depth direction the defect exists has been difficult.

The present invention has been made to solve such a problem and an object thereof is to provide a non-destructive inspection system and a non-destructive inspection method that enable obtaining of state information in a depth direction of an inspection object in a non-destructive inspection performed by using neutrons to the inspection object.

Solution to the Problem

In order to achieve the above object, a non-destructive inspection system according to the present disclosure includes: a neutron emission unit capable of emitting neutrons; a neutron detector capable of detecting the neutrons emitted from the neutron emission unit and penetrating through an inspection object; a collimator positioned between the inspection object and the neutron detector and arranged so that the neutrons penetrating through the inspection object enter the neutron detector with predetermined directivity; and a calculation unit configured to perform calculation based on a result detected by the neutron detector.

The neutron emission unit emits the neutrons such that a center axis of neutron emission intersects a center axis direction of the collimator. The calculation unit is capable of generating information about the inspection object in the center axis direction of the collimator, based on position information of the neutron detector and/or position information of the neutron emission unit, information about an angle at which the center axis of the neutron emission intersects the center axis direction of the collimator, and a neutron amount detected by the neutron detector.

The above-described non-destructive inspection system may be configured so that the neutron emission unit is configured to emit neutrons such that the center axis of the neutron emission intersects the center axis direction of the collimator at an angle of 10 degrees to 80 degrees.

The above-described non-destructive inspection system may be configured to include a plurality of detection units as the neutron detector, and configured so that the calculation unit specifies a detection unit out of the plurality of detection units, having detected a peculiar neutron amount based on neutron amounts detected by the plurality of detection units.

The above-described non-destructive inspection system may be configured so that the calculation unit generates a fitting curve based on the neutron amounts detected by the plurality of detection units, and specifies the detection unit that detects the peculiar neutron amount based on a difference between the fitting curve and the neutron amount detected by each of the detection units.

The above-described non-destructive inspection system may be configured so that the calculation unit specifies the detection unit that detects the peculiar neutron amount based on a difference between standard information corresponding to material information of the inspection object and the neutron amount detected by each of the detection units.

The above-described non-destructive inspection system may be configured so that: the neutron emission unit is movable relatively to the inspection object; and the calculation unit specifies the detection unit that detects the peculiar neutron amount, based on the neutron amounts detected by the plurality of detection units before a movement of the neutron emission unit and the neutron amounts detected by the plurality of detection units after the movement of the neutron emission unit.

The above-described non-destructive inspection system may be configured so that: the neutron emission unit is capable of emitting the neutrons toward a first position and a second position which are differently distanced from the collimator in the center axis direction of the collimator; the neutron detector is capable of detecting a first neutron amount detected when the neutron emission unit emits the neutrons toward the first position and a second neutron amount detected when the neutron emission unit emits the neutrons toward the second position; and the calculation unit is capable of generating information about the inspection object between the first position and the second position based on the first neutron amount and the second neutron amount.

The above-described non-destructive inspection system may be configured so that the neutron emission unit is configured to emit the neutrons to the first position and the second position by changing relative positions of the neutron detector and the neutron emission unit.

The above-described non-destructive inspection system may be configured so that the neutron emission unit is configured to emit the neutrons to the first position and the second position by changing an emitting direction of the neutrons emitted from the neutron emission unit.

The above-described non-destructive inspection system may be configured to include a first detection unit and a second detection unit as the neutron detector, and configured so that: the first detection unit and the second detection unit are movable with respect to the inspection object while maintaining a relative position with the neutron emission unit; the first detection unit is capable of detecting a first neutron amount in a case of the neutron emission unit emitting the neutrons toward the first position before the movement; and the second detection unit is capable of detecting a second neutron amount in a case of the neutron emission unit emitting the neutrons toward the second position after the movement.

The above-described non-destructive inspection system may be configured to include a plurality of detection units arranged in a two-dimensional direction as the neutron detector, and configured so that: the neutron emission unit emits the neutrons through a collimator that restricts an emitting direction to two-dimensional directions; and the calculation unit is capable of generating information about the inspection object based on information of a plurality of neutron amounts detected by the plurality of detection units.

The above-described non-destructive inspection system may be configured so that the calculation unit is configured to generate information about a composition of the inspection object between the first position and the second position, based on the first neutron amount and the second neutron amount.

The above-described non-destructive inspection system may be configured so that: the neutron emission unit is capable of emitting a pulsed neutron beam; and the calculation unit detects, at a set detection time, time information of the pulsed neutron beam emitted from the neutron emission unit and thermal neutrons detected by the neutron detector, the thermal neutrons generated when the pulsed neutron beam having emitted penetrate through the inspection object.

The above-described non-destructive inspection system may be configured so that the calculation unit is capable of calculating distance information indicating a position of an abnormal portion in the center axis direction of the collimator, based on position information of the neutron detector and/or position information of the neutron emission unit, information about an angle at which the center axis of the neutron emission intersects the center axis direction of the collimator, and a neutron amount detected by the neutron detector, the calculation unit being capable of generating information about a volume of the abnormal portion using the distance information and attenuation information of a structure through which the neutrons penetrate.

In order to achieve the above object, a non-destructive inspection method according to the present disclosure is implemented by using: a neutron emission unit capable of emitting neutrons; a neutron detector capable of detecting the neutrons emitted from the neutron emission unit and penetrating through an inspection object; a collimator positioned between the inspection object and the neutron detector and arranged so that the neutrons penetrating through the inspection object enter the neutron detector with predetermined directivity; and a calculation unit configured to perform calculation based on a result detected by the neutron detector. The method includes: emitting the neutrons, by the neutron emission unit, toward the inspection object such that a center axis of neutron emission intersects a center axis direction of the collimator; detecting neutrons by the neutron detector; and generating, by the calculation unit, information about the inspection object in the center axis direction of the collimator, based on position information of the neutron detector and/or position information of the neutron emission unit, information about an angle at which the center axis of the neutron emission intersects the center axis direction of the collimator, and a neutron amount detected by the neutron detector.

Advantages of the Invention

According to the present disclosure using the above-described means, it is possible to obtain state information in the depth direction of an inspection object in a non-destructive inspection performed by using neutrons to the inspection object.

DESCRIPTION OF EMBODIMENT

Embodiments of the present disclosure will be described in detail with reference to the drawings.

First Embodiment

Figure 1:
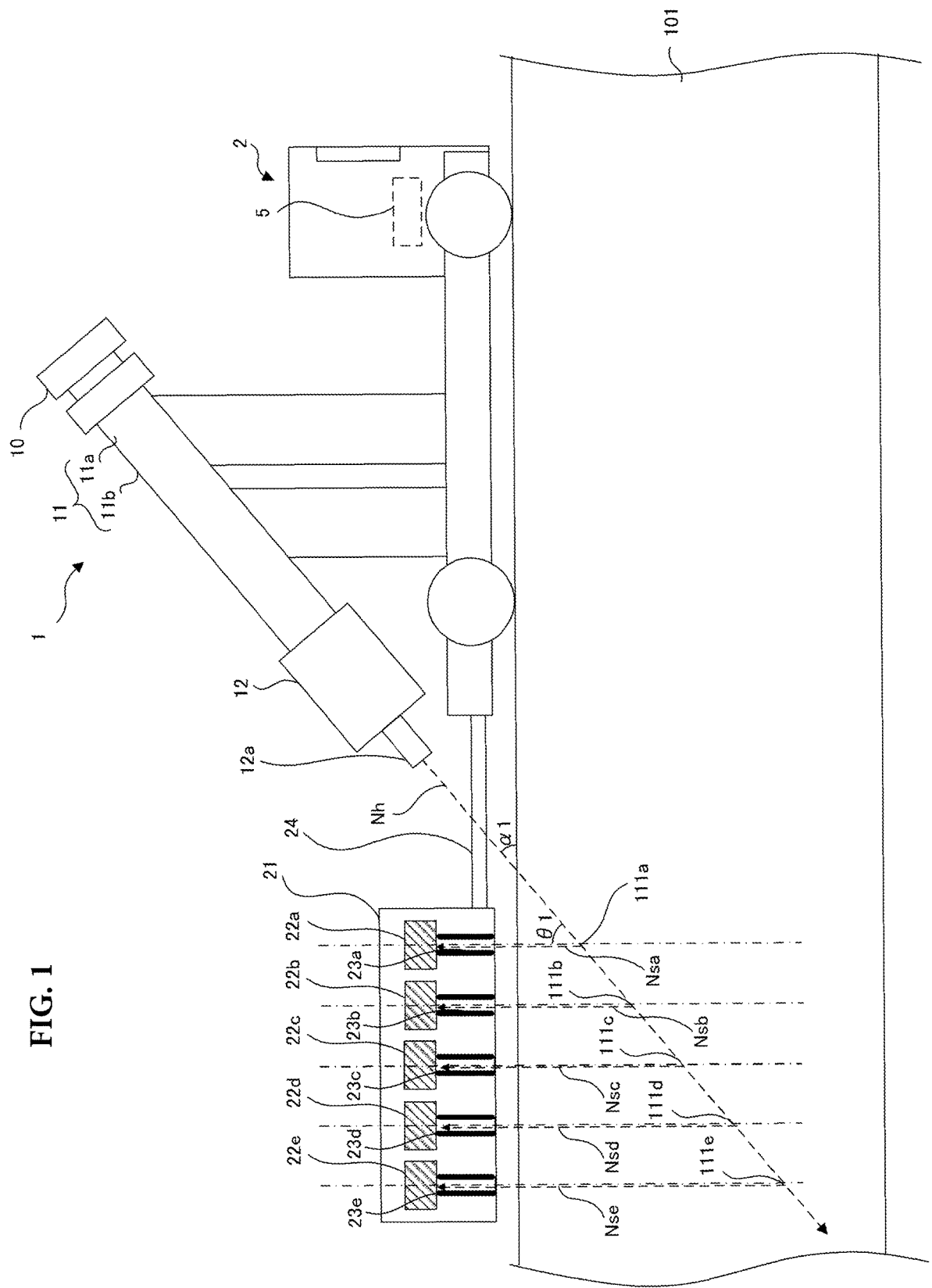
FIG. 1 is a schematic configuration diagram illustrating a non-destructive inspection system according to a first embodiment of the present disclosure.

A first embodiment of the present disclosure will be described below.
<Overall Configuration>
FIG. 1 illustrates a general configuration of a non-destructive inspection system 1 according to a first embodiment of the present disclosure. The configuration of the non-destructive inspection system 1 according to this embodiment will now be described with reference to these figures.

As shown in FIG. 1, in the non-destructive inspection system 1 of the present embodiment, a control unit 5, a power supply unit 10, a linear accelerator 11, and a neutron emission unit 12 are mounted on a vehicle 2 which is a movable body, and a neutron detection unit 21 is connected to the vehicle 2 via a connection unit 24. The vehicle 2 is, for example, a truck. The power supply unit 10, the linear accelerator 11, and the neutron emission unit 12 are mounted on a load-carrying platform, and the control unit 5 is mounted on a driver's seat. In the present embodiment, the vehicle 2 travels on a bridge 101 mainly made of concrete, and performs non-destructive inspection with respect to the bridge 101 as an inspection object.

The power supply unit 10 is a power generator that supplies power to each unit. In one preferred embodiment, the power generator of the power supply unit 10 has a power generation performance to enable generation of at least protons that are charged particles, generates small voltage fluctuations, and is resistant to harmonic current. The power supply unit 10 may include a battery capable of storing electric power generated by the power generator.

The linear accelerator 11 has an ion source 11a that generates protons, and is connected to the neutron emission unit 12 from the ion source 11a via a cylindrical accelerator 11b. The cylindrical accelerator 11b accelerates protons generated in the ion source 11a and emits the protons, as a proton beam, to the neutron emission unit 12.

The neutron emission unit 12 includes a target section (not shown) and an emission collimator 12a. The target section generates neutrons by colliding with protons, and is formed to contain, for example, beryllium. To the target section, an emission collimator is connected. The emission collimator selects neutrons in a predetermined direction among neutrons generated at the target section. With this emission collimator, the directivity of the fast neutrons Nh to be emitted can be enhanced. Note that the path from the linear accelerator 11 to the target section has a structure capable of maintaining a high vacuum state so as not to obstacle penetration of the charged particles.

The neutron detection unit 21 includes neutron detectors 22a to 22e capable of detecting thermal neutrons and collimators 23a to 23e for enhancing the directivity of thermal neutrons incident on the respective neutron detectors. The neutron detection unit 21 is connected to the vehicle 2 via the connection unit 24. The neutron detectors 22a to 22e have an array structure in which the neutron detectors 22a to 22e are arranged in a line parallel to the traveling direction of the vehicle 2.

In FIG. 1, the non-destructive inspection system 1 is placed on a bridge 101 which is an inspection object.

The neutron emission unit 12 is inclined on the vehicle 2 so as to emit neutrons toward the bridge 101. The directivity of the fast neutrons emitted from the neutron emission unit 12 is enhanced by the emission collimator, and the fast neutrons are emitted to the bridge 101. In FIG. 1, the center axis of the emitted fast neutrons is indicated by a dotted line and denoted by Nh. Although the directivity of the fast neutrons to be emitted is enhanced by the emission collimator, the fast neutrons do not need to be a completely parallel beam and may have a slight diffusion angle. In that case, the center axis of the beam of the fast neutrons diffusing with a diffusion angle is Nh in FIG. 1.

In FIG. 1, the center axes of the collimators 23a to 23e are indicated by dot-and-dash lines. The center axis of each collimator indicates the center of directivity of the collimator. The fast neutrons from the neutron emission unit 12 are emitted so that the center axis direction of the collimators 23a to 23e intersect the center axis of the fast neutrons at an angle 81. Specifically, the neutron emission unit 12 emits fast neutrons such that the angle 81 at which the center axis of the emitted fast neutrons crosses the center axis direction of each collimator is 10 degrees to 80 degrees. Reducing the angle 81 deepens penetration of fast neutrons into the bridge 101, whereas increasing the angle 81 makes penetration of fast neutrons shallower. The positions at which the fast neutrons Nh intersect the center axes of the collimators are shown by 111a to 111e in FIG. 1. The fast neutrons Nh collide with the material constituting the bridge 101, and some of the fast neutrons Nh are scattered as thermal neutrons. The thermal neutrons scattered at the position 111a are detected as Nsa at the neutron detector 22a via the collimator 23a. Similarly, the thermal neutrons scattered at the positions 111b to 111e are detected by the neutron detectors 22b to 22e, respectively.

Figure 2:
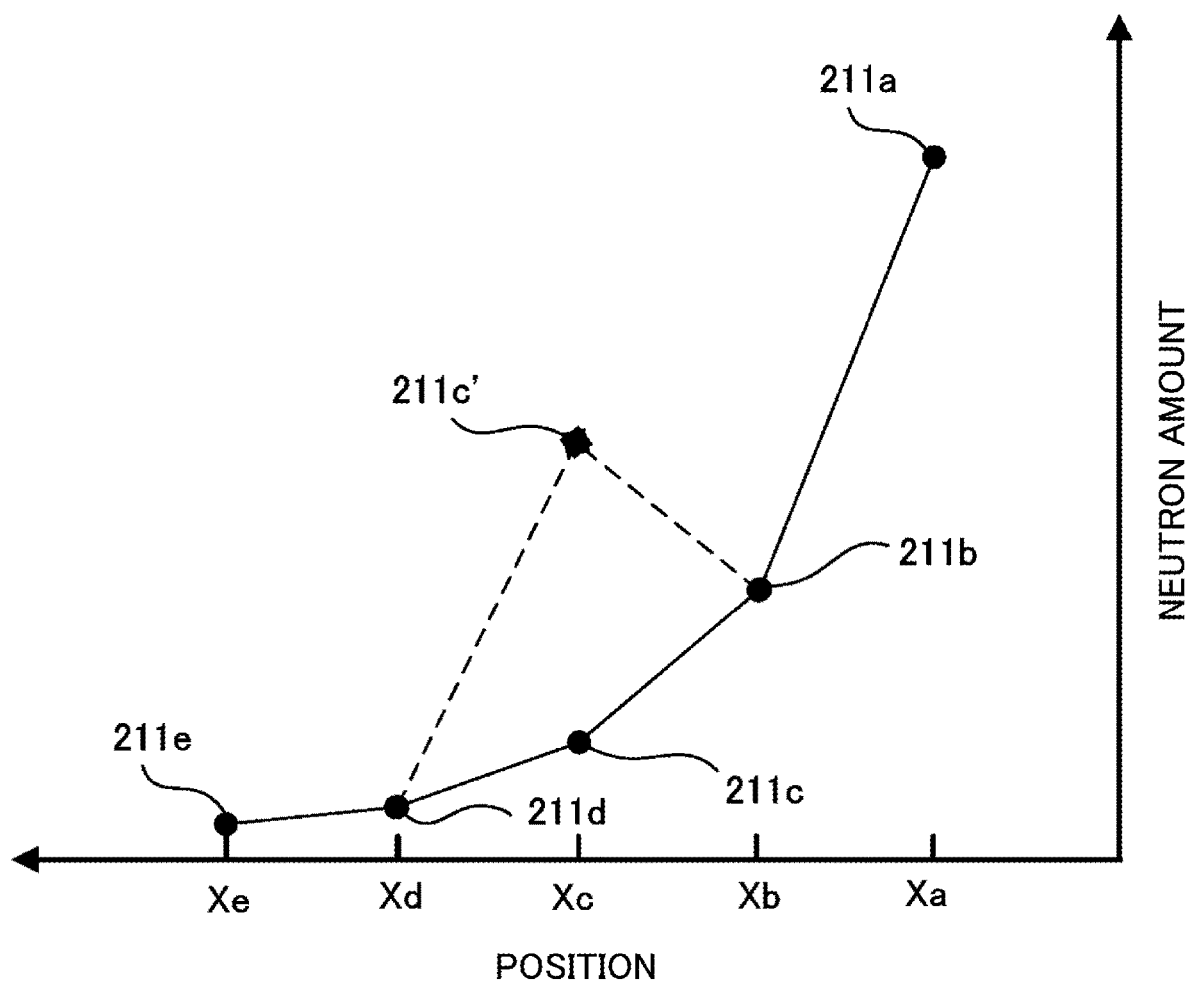
FIG. 2 is a graph illustrating a detection result of a neutron detector in the non-destructive inspection system according to the first embodiment of the present disclosure.
Figure 3:
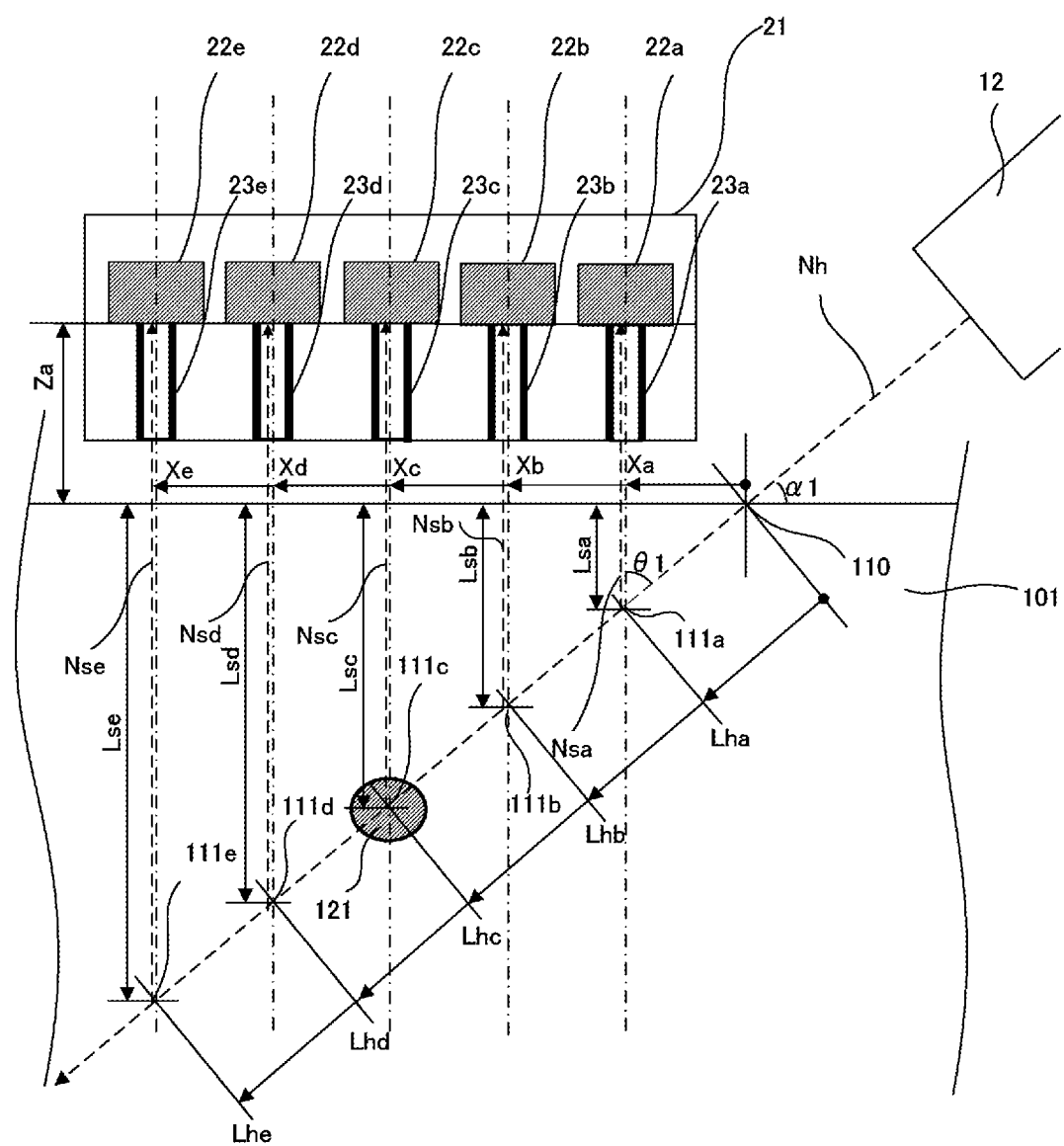
FIG. 3 is a schematic configuration diagram illustrating a relationship between an inspection object and a neutron detection unit in the non-destructive inspection system according to the first embodiment of the present disclosure.

Next, with reference to FIGS. 2 and 3, the following describes a neutron amount (i.e., a detection result) detected by the neutron detectors 22a to 22e, and the relationship between the bridge 101 (inspection object), and the neutron detection unit 21. FIG. 2 is a graph illustrating the neutron amount detected by the neutron detectors 22a to 22e. FIG. 3 is a schematic configuration diagram illustrating the relationship between the bridge 101 and the neutron detection unit 21. Note that what is described with reference to FIG. 1 is omitted.

FIG. 2 is a graph illustrating the neutron amount detected by the neutron detector on the vertical axis and the position of the neutron detector on the horizontal axis. The solid line indicates a case where no abnormality takes place in the inspection target, and the dotted line indicates a case of an abnormality taking place in the inspection object. The neutron amounts on the vertical axis indicate amounts of thermal neutrons detected by the neutron detectors, and are each a value obtained by counting the number of detected thermal neutrons. The point 211a represents an amount of thermal neutrons Nsa detected by the neutron detector 22a, the thermal neutrons Nsa being fast neutrons Nh emitted from the neutron emission unit 12 and having scattered through the bridge 101 (inspection target). Similarly, the points 211b to 211e indicate the neutron amounts detected by the neutron detectors 22b to 22e.

Here, attenuation of fast neutrons and thermal neutrons will be described. Fast neutrons can penetrate the air almost without attenuation. However, in a case of penetration through an object such as concrete, attenuation occurs due to collision with constituent elements. Thermal neutrons attenuate in the air and in objects. Where the attenuation rate is $\beta$, the neutron amount $CN_x$ after attenuation with respect to an incident amount $CN_0$ can be expressed by the following mathematical 1 in relation to a passing distance X. Note that the attenuation rate $\beta$ is a value determined by the relationship between penetrating neutrons and a penetrated material.

$$CN_x = F(\beta, X) \cdot CN_0 \quad \text{(Mathematical 1)}$$

As the function F, for example, an exponential function can be used.

Here, the attenuation of the fast neutrons Nh emitted from the neutron emission unit 12 in the process of reaching the neutron detector 22a will be described with reference to FIG. 2 and FIG. 3. In FIG. 3, the center axis of the fast neutrons emitted from the neutron emission unit 12 and the center axis of the collimator 23a intersect at an angle $\theta 1$. When the center axis of the collimator 23a is orthogonal to the bridge 101 which is the inspection object, the incident angle $\alpha 1$ of the fast neutrons Nh emitted from the neutron emission unit 12 to the inspection object can be expressed by the following mathematical 2.

$$\alpha 1 = 90° - \theta 1 \quad \text{(Mathematical 2)}$$

The distance Lha of the fast neutrons Nh incident on the bridge 101 at the position 110 and reaching the position 111a can be expressed by the following mathematical 3, where Xa is the distance from the position 110 to the center axis of the collimator 23a.

$$Lha = Xa/\cos\alpha 1 \quad \text{(Mathematical 3)}$$

The fast neutrons then scatter in the material and generate thermal neutrons. The distance Lsa through which the thermal neutrons generated at the position 111a penetrate from the position 111a to the surface of the inspection object, that is, toward the neutron detector can be expressed by the following mathematical 4.

$$Lsa = Xa \cdot \tan\alpha 1 \quad \text{(Mathematical 4)}$$

Thermal neutrons emitted from the surface of the inspection object penetrate the air and are detected by the neutron detector 22a via the collimator 23a. Here, the distance of penetration through the air is defined as Za. In this case, the thermal neutron amount CNs after attenuation with respect to an emission amount CNh of the fast neutrons can be expressed by the following mathematical 5. Note that the attenuation rate of fast neutrons in the constituent material of the bridge is denoted by $\beta h$; the attenuation rate of thermal neutrons in the constituent material of the bridge is denoted by $\beta s$; and the attenuation rate of thermal neutrons in the air is denoted by $\beta a$. The position of the position 110, Za, and Xa to Xe can be determined by measuring the position of the neutron emission unit 12 and the position of the neutron detection unit 21 in relation to the inspection object.

$$CNs \propto F(\beta h, \beta a, \beta s, Lha, Lsa, Za) \cdot CNh \quad \text{(Mathematical 5)}$$

That is, the relative relationship of the neutron amount detected by each neutron detector is determined by each attenuation rate, the incident angle of fast neutrons, and the position of each neutron detector. The solid line in the graph of FIG. 2 satisfies the relationship of mathematical 5. Therefore, if the neutron amounts detected by the neutron detectors 22a to 22e include a detection result that deviates from the relationship of mathematical 5, it is possible to estimate that there is an abnormal portion in the center axis direction of the collimator of the neutron detector that has obtained the detection result.

The dotted line in the graph of FIG. 2 represents a neutron amount in a case where there is an abnormal portion 121 underneath the collimator 23c. The abnormal portion 121 is a cavity formed as a defect in the bridge, filled with water. The fast neutrons incident on the water are scattered by the water and become thermal neutrons. Water generates more thermal neutrons than concrete which is a main constituent material of the bridge. That is, the amount of neutrons detected by the neutron detector 22c is larger when there is water as compared to a case without water. Therefore, in FIG. 2, the point 211c′ indicating a neutron amount when there is water has a greater value than the point 211c indicating a neutron amount when there is no water.

Next, a case will be considered in which the abnormal portion 121 is a cavity formed as a defect in a bridge, filled with the air. The air generates a smaller amount of thermal neutrons than concrete, which is the main constituent material of the bridge. That is, the amount of neutrons detected by the neutron detector 22c is smaller when there is a cavity than when there is no cavity.

Thus, by determining the difference from the solid line in the graph of FIG. 2 satisfying the relationship of mathematical 5, it is possible to specify which neutron detector is detecting an abnormality. The neutron detector 22c detects thermal neutrons that have penetrated through the distance Lsc. Therefore, the distance from the surface, that is, the depth can be specified depending on which neutron detector has detected the abnormality. Since the neutron detector 22c detects the abnormality, it is possible to identify that there is an abnormality between the surface and the depth of Lsc. When the neutron amount detected is small, it can be estimated that there is a cavity as a defect, and when the neutron amount detected is large, it can be estimated that there is a defect containing a light element such as water.

<Control Unit Configuration>

Figure 4:
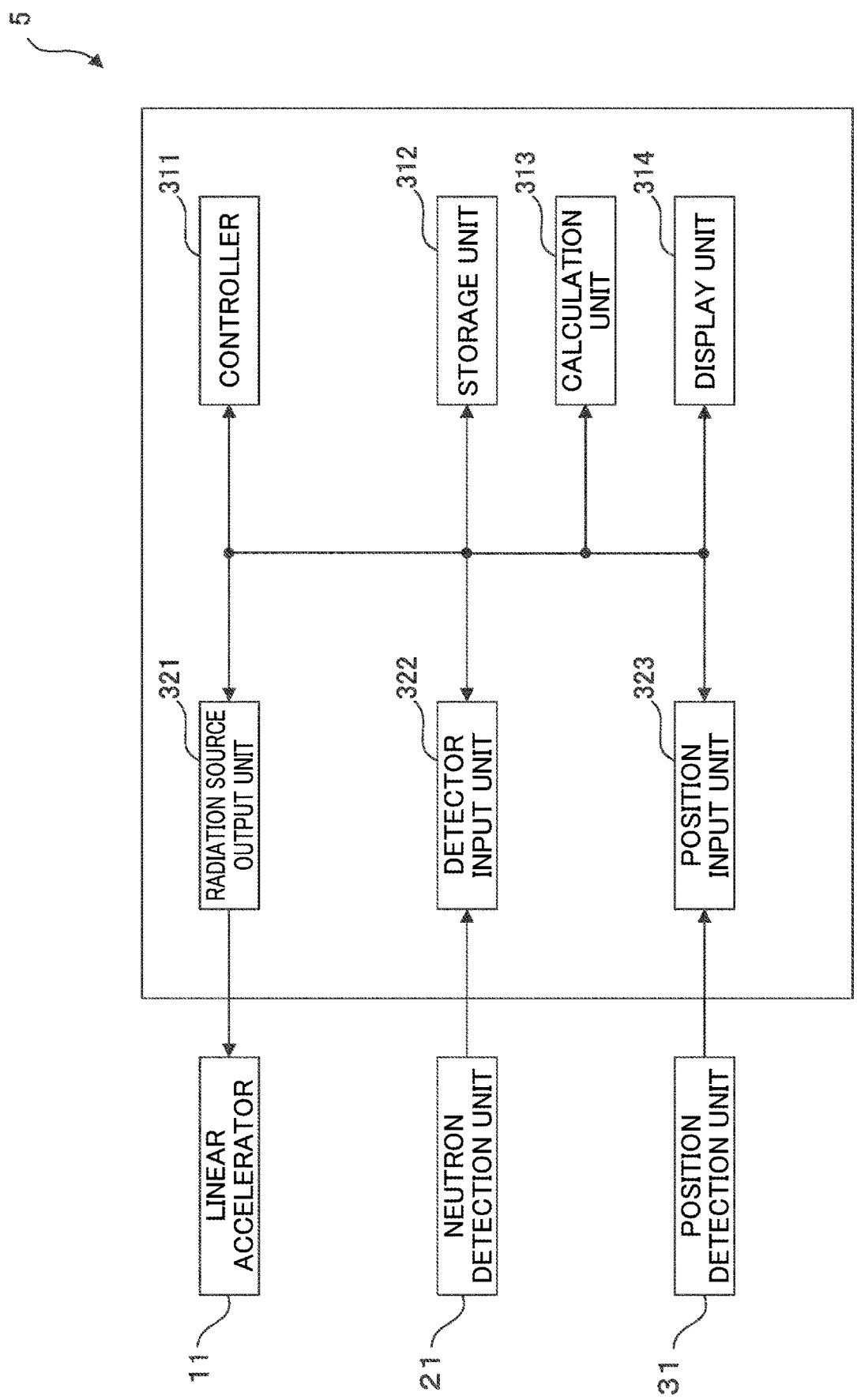
FIG. 4 is a block diagram illustrating a control unit of the present disclosure.

FIG. 4 is a block diagram illustrating the configuration of the control unit 5. The control unit 5 is a unit including a controller 311, a storage unit 312, a calculation unit 313, a display unit 314, a radiation source output unit 321, a detector input unit 322, and a position input unit 323, and is configured as a dedicated computer, a general-purpose computer in which software is installed, or the like. The controller 311 controls the entire control unit 5. The storage unit 312 stores information of the detection result of the neutron amount detected by each of the neutron detectors 22a to 22e. In addition, the storage unit 312 stores data of the attenuation rate for each material. The calculation unit 313 processes the detection result and performs calculation for detecting an abnormal value in the detection results. For example, the calculation unit 313 generates a fitting curve based on the detection results, and specifies a neutron detector having detected a peculiar neutron amount based on a difference between the fitting curve and the neutron amount detected by each detector. The display unit 314 is a device that shows the abnormal value detected so that the user can visually recognize the abnormal value. The radiation source output unit 321 controls the linear accelerator 11 connected. For example, the linear accelerator 11 can be controlled so that the neutron emission unit 12 emits a temporally discrete pulsed neutron beam. Further, the detector input unit 322 receives the output from the neutron detection unit 21 constituting the connected neutron detectors 22a to 22e. The position input unit 323 receives position information, such as the position of the neutron detection unit 21 and the position and angle of the neutron emission unit 12, from a position detection unit 31 connected. The position detection unit 31 may be, for example, a GPS, a camera, or other measurement means. In addition, all the components included in the control unit 5 do not have to be on the vehicle 2 which is a movable body. For example, the control unit 5 may include a communication unit and communicate with the storage unit 312, the calculation unit 313, and the display unit 314 included in an external system (including a cloud service or the like) via a network such as a dedicated line or the Internet.

<Flow of Processing>

Figure 5:
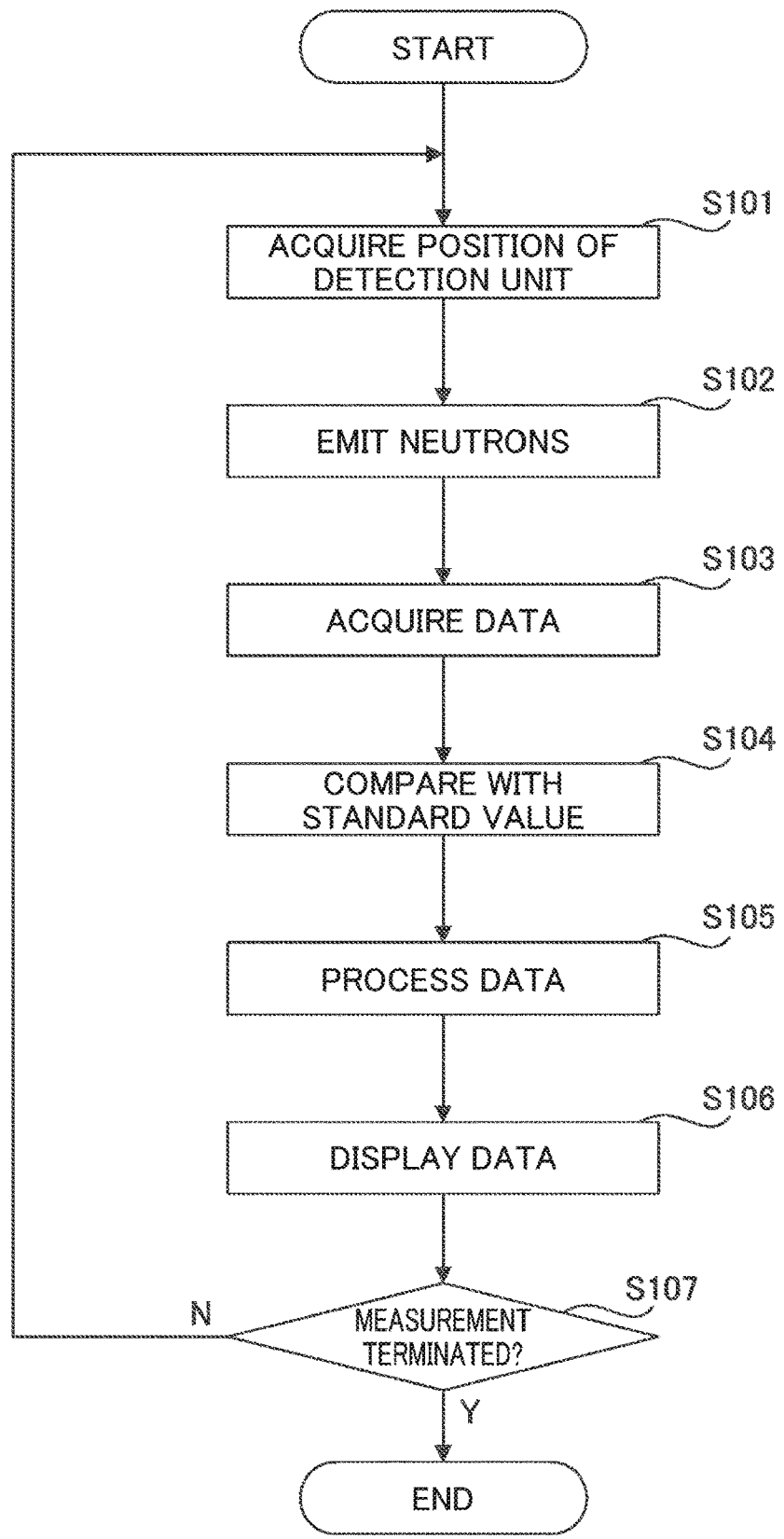
FIG. 5 is a flowchart illustrating an operation of the non-destructive inspection system according to the first embodiment of the present disclosure.

Next, the operation of the non-destructive inspection system 1 according to the first embodiment will be described with reference to the flowchart shown in FIG. 5.

In step S101, the position input unit 323 acquires position information of the neutron detection unit 21 and the neutron emission unit 12 and position information of the inspection target.

In step S102, the radiation source output unit 321 controls the linear accelerator 11 to emit a pulsed neutron beam from the neutron emission unit 12.

In step S103, the detector input unit 322 acquires data of the neutron amount detected by the neutron detectors 22a to 22e constituting the neutron detection unit 21, and stores the data in the storage unit 312.

In step S104, the calculation unit 313 compares the acquired data with the standard value data. The standard value data is, for example, data in a case of no abnormality in the inspection object, which serves as the basis of the solid line in the graph of FIG. 2. With the standard value data, a fitting curve can be generated based on a plurality of pieces of acquired data. In addition, for example, a value close to the average value or the median value of the variance values may be extracted and derived from a plurality of pieces of inspection data obtained by inspecting a plurality of portions of the bridge. Further, in a case where the characteristics (material information), e.g., the attenuation rate, of the concrete used as the material of the bridge are known, for example, data (standard information) calculated in advance in accordance with the characteristics of the concrete stored in the storage unit 312 may be used as the standard value data.

In step S105, the calculation unit 313 specifies a neutron detector having output a peculiar value through the comparison in step S104. The calculation unit 313 performs data processing for estimating at which depth from the position of the specified neutron detector, the abnormal portion exists.

In step S106, the display unit 314 displays the data processed in step S105 in a visible form to the user.

In step S107, the controller 311 determines whether to terminate the measurement in response to a request from the user. The process is terminated if it is determined to terminate the measurement (Y). If it is not determined to terminate the measurement (N), the process returns to step S101.

<Detection Timing>

Figure 6:
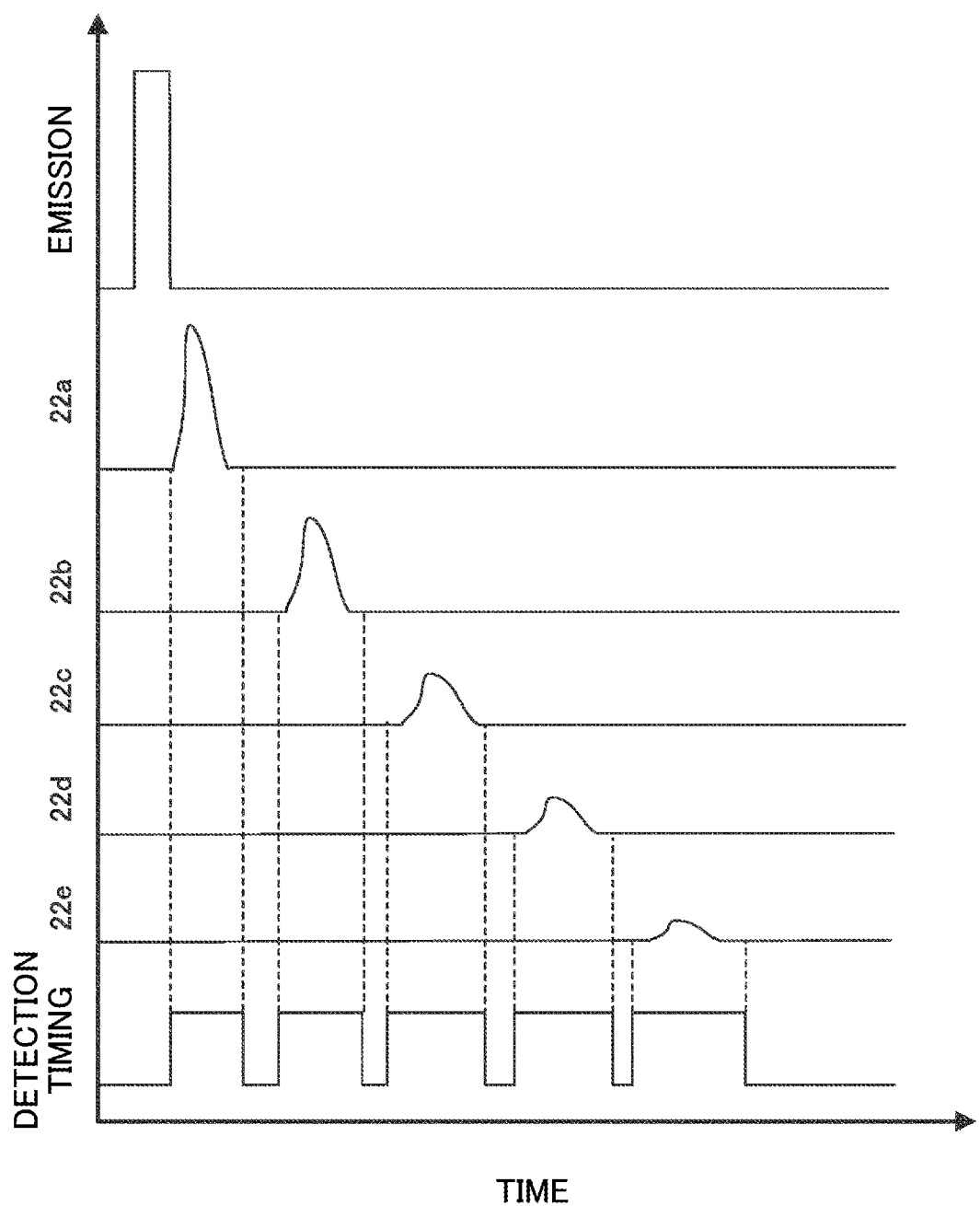
FIG. 6 is a timing chart of detection timing of the non-destructive inspection system according to the first embodiment of the present disclosure.

FIG. 6 is a timing chart showing detection timing of the non-destructive inspection system according to the first embodiment of the present disclosure. The horizontal axis represents time having elapsed. The vertical axis indicates, from the top, the timing of pulse emission of fast neutrons from the neutron emission unit 12, detection results by the neutron detectors 22a to 22e, and the detection timing of the neutron detectors. The velocity of the thermal neutrons is about 2200 [m/s], which is extremely slow compared to, for example, the velocity of fast neutrons at 1.0 [MeV], which is $1.4 \times 10^7$ [m/s]. Therefore, the time difference between the emission timing of the fast neutrons and the detection timing of the thermal neutrons depends on the penetration distance of the thermal neutrons. Therefore, the timing of detecting thermal neutrons is gradually delayed from the neutron detector 22a to the neutron detector 22e. The delay in detecting timing of the thermal neutrons can be calculated based on a path length calculated based on the position information or the like. Therefore, the detection timing of each of the neutron detectors 22a to 22e can be set with respect to the timing of pulse emission from the neutron emission unit 12. By synchronizing the detection timing of each of the neutron detectors 22a to 22e with the timing of pulse emission, thermal neutrons generated for the amount of fast neutrons emitted can be detected without other noises.

As described hereinabove, by having the neutron emission unit 12 emit neutrons toward the bridge 101 (inspection object) so that the center axis of the fast neutrons Nh emitted obliquely intersects the center axis directions of the collimators and having the neutron detectors 22a to 22e detect thermal neutrons, an abnormal state in the depth direction of the bridge 101 can be detected based on the position information of the neutron detection unit 21, the position information of the neutron emission unit 12, and the information of the angle at which the center axes of the emitted fast neutrons intersect the center axis directions of the collimators 23a to 23e.

Second Embodiment

Next, a second embodiment of the present disclosure will be described. The second embodiment uses the non-destructive inspection system 1 of the first embodiment and moves the non-destructive inspection system 1 relatively to the inspection object, so that the position of an abnormal portion in the depth direction can be specified.

Figure 7:
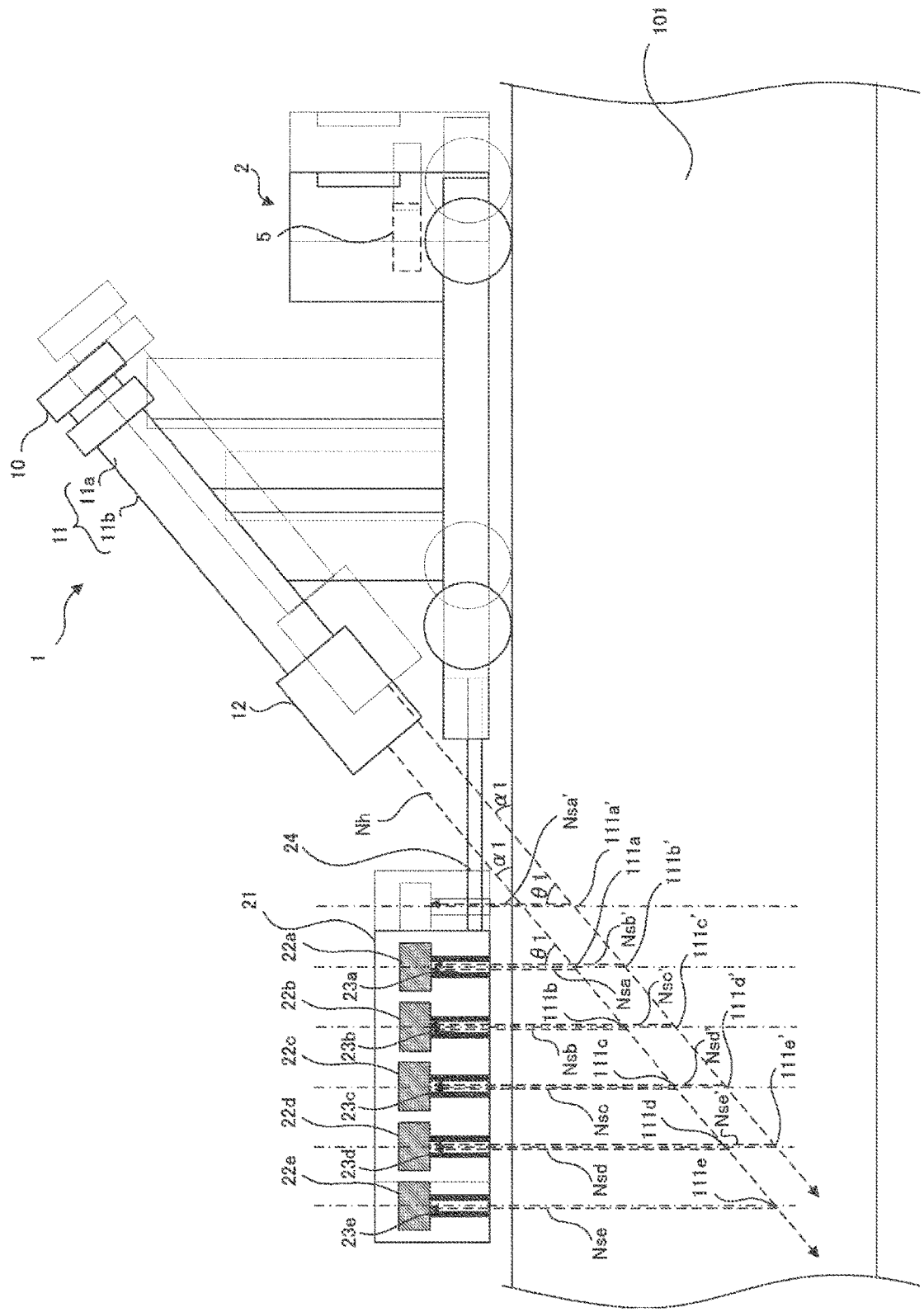
FIG. 7 is a schematic configuration diagram illustrating a non-destructive inspection system according to a second embodiment of the present disclosure.

FIG. 7 is a schematic configuration diagram of the non-destructive inspection system 1 according to the first embodiment of the present disclosure. The same reference characters are given to the same components as those of the first embodiment, and a description thereof is omitted.

In FIG. 7, a non-destructive inspection system 1 shown by a solid line performs detection before a movement, while a non-destructive inspection system shown by a dotted line performs detection after a movement relative to the inspection object. The neutron emission unit 12 moves while maintaining the incident angle α1 to the inspection object. A distance of the movement in FIG. 7 corresponds to one pitch of the neutron detectors adjacent to each other. The positions where the fast neutrons Nh' intersect the center axes of the collimators after the movement are shown by 111a' to 111e' in FIG. 7. The thermal neutrons scattered at the position 111a' after the movement are detected as Nsa' by the neutron detector 22a via the collimator 23a. Similarly, thermal neutrons scattered at the position 111b' to the position 111e' are detected by the neutron detectors 22b to 22e, respectively.

Figure 8:
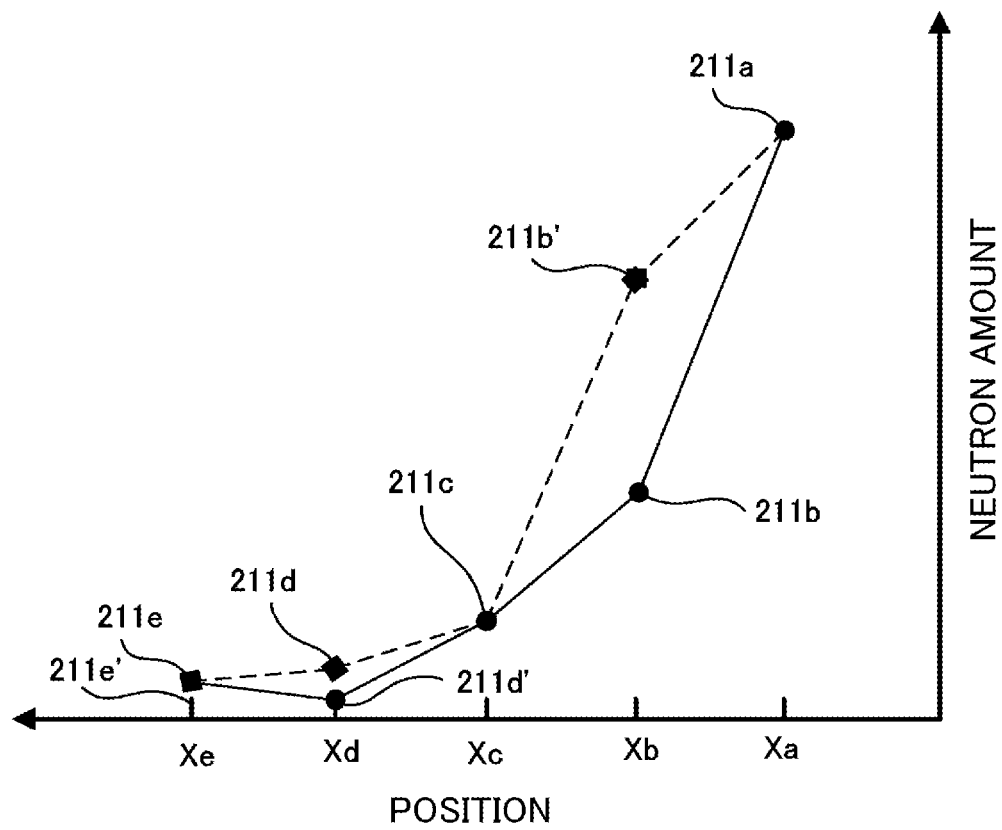
FIG. 8 is a graph illustrating a detection result by the neutron detector in the non-destructive inspection system according to the second embodiment of the present disclosure.
Figure 9:
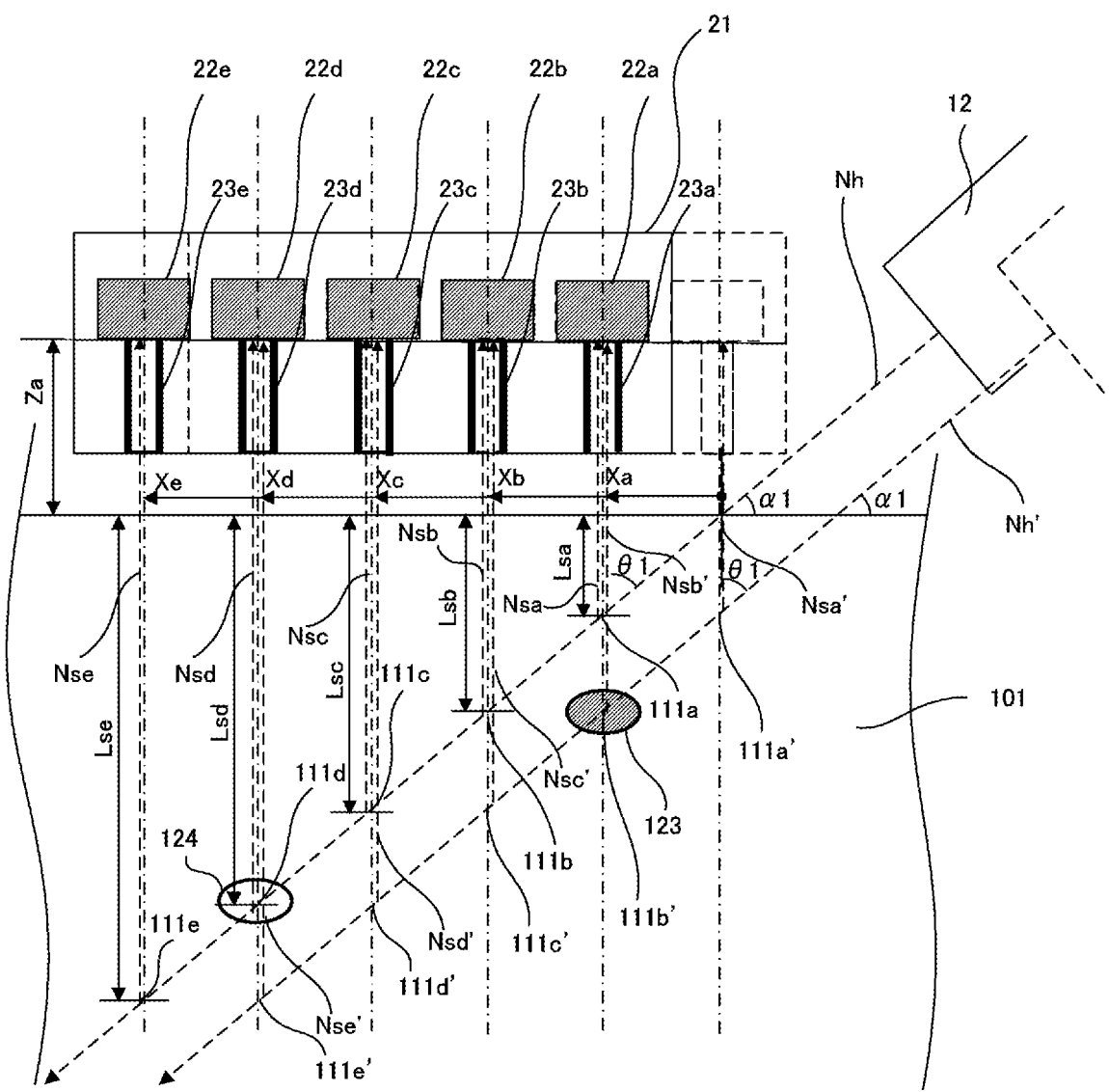
FIG. 9 is a schematic configuration diagram illustrating a relationship between an inspection object and a neutron detection unit in the non-destructive inspection system according to the second embodiment of the present disclosure.

Next, with reference to FIG. 8 and FIG. 9, the following describes the neutron amount, that is, a detection result by each of the neutron detectors 22a to 22e and the relationship between the bridge 101 (inspection object) and the neutron detection unit 21. FIG. 8 is a graph showing the neutron amounts detected by the neutron detectors 22a to 22e before and after the movement. FIG. 9 is a schematic configuration diagram illustrating the relationship between the bridge 101 and the neutron detection unit 21 before and after movement. Note that what has been already described with reference to FIG. 7 is omitted.

FIG. 8 is a graph showing the neutron amounts detected by the neutron detectors on the vertical axis and the positions of the neutron detectors on the horizontal axis, where the solid line represents a state before the movement and the dotted line represents a state after the movement. The neutron amounts on the vertical axis indicate amounts of thermal neutrons detected by the neutron detectors, and are each a value obtained by counting the number of detected thermal neutrons. The point 211a represents an amount of thermal neutrons Nsa detected by the neutron detector 22a, the thermal neutrons Nsa being fast neutrons Nh emitted from the neutron emission unit 12 and having scattered through the bridge 101 (inspection target). Similarly, the points 211b to 211e indicate the neutron amounts detected by the neutron detectors 22b to 22e. The point 211b' represents an amount of thermal neutrons Nsb' detected by the neutron detector 22b, the thermal neutrons Nsb' being fast neutrons Nh' emitted from the neutron emission unit 12 and having scattered through the bridge 101 (inspection target). Similarly, the point 211d' is an amount of thermal neutrons Nsd' detected by the neutron detector 22d, the thermal neutrons Nsd' being the fast neutrons Nh' emitted from the neutron emission unit 12 and having scattered through the bridge 101 (inspection target). FIG. 9 is a diagram showing a case where abnormal portions 123 and 124 exist in a bridge 101.

The solid line in the graph of FIG. 8 shows a neutron amount when the abnormal portion 124 is detected under the collimator 23d. The abnormal portion 124 is a cavity which is a defect that occurred in the bridge. The cavity is filled with the air, and the amount of thermal neutrons generated is smaller than that generated in concrete which is a main constituent material of the bridge. Therefore, the point 211d indicates a smaller value than the standard value mentioned in the first embodiment.

Next, the detection result by the neutron detector 22b after the movement will be described. The absolute position of the neutron detector 22b relative to the inspection object after the movement corresponds to the position of the neutron detector 22a before the movement. The abnormal portion 123 is at the position of the point 111b'. The abnormal portion 123 is a cavity formed in the bridge as a defect, which is filled with water. The fast neutrons incident on the water turns to thermal neutrons due to the water. Therefore, water generates more thermal neutrons than concrete which is a main constituent material of the bridge. That is, as shown in FIG. 8, the number of neutrons detected by the neutron detector 22b is larger when there is water (point 211b') as compared to a case without water (point 211b). Therefore, it can be determined that, at that position, there is an abnormality within the depth of Lsb.

As described above, the neutron emission unit 12 can emit the fast neutrons Nh and Nh' toward the positions 111a (first position) and 111b' (second position) distanced differently from the collimators 23a and 23b in the center axis direction of the collimators, by moving the non-destructive inspection system 1 including the neutron emission unit 12 relatively to the inspection object. The neutron detector 22a detects thermal neutrons Nsa generated and scattered at the position 111a when the neutron emission unit 12 emits fast neutrons toward the position 111a (a first neutron amount at 211a in FIG. 8). Next, after the movement, the neutron detector 22b detects thermal neutrons Nsb' generated and scattered at the position 111b' when the neutron emission unit 12 emits fast neutrons toward the position 111b' (a second neutron amount at 211b' in FIG. 8). Then, based on the first neutron amount and the second neutron amount, the calculation unit 313 can specify that there is an abnormal portion between the depths of 111a and 111b', that is, between Lsa and Lsb. It is also possible to specify whether the abnormal portion is a cavity or water based on the neutron amounts.

<Flow of Processing>

Figure 10:
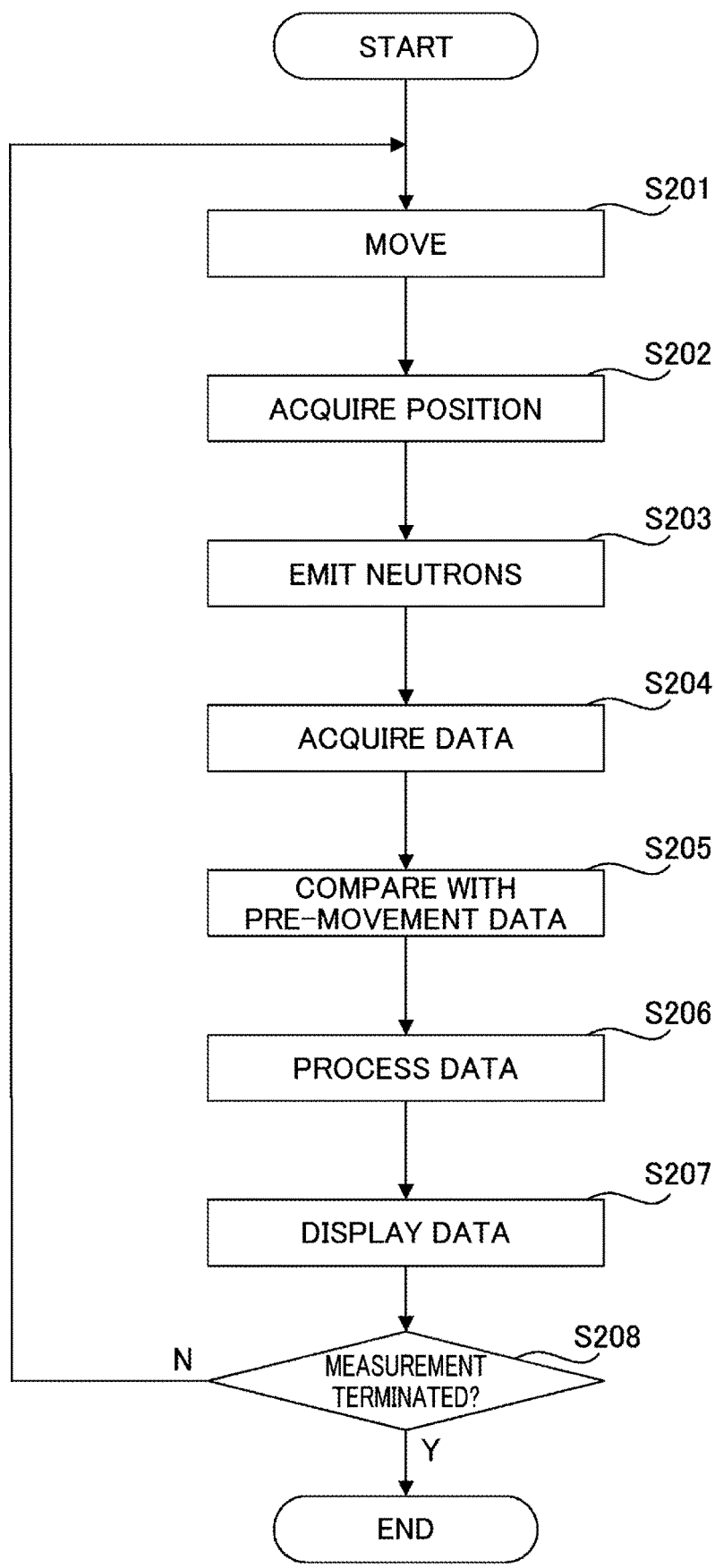
FIG. 10 is a flowchart illustrating an operation of the non-destructive inspection system according to the second embodiment of the present disclosure.

Next, the operation of the non-destructive inspection system 1 according to the second embodiment will be described with reference to the flowchart shown in FIG. 10.

In step S201, the non-destructive inspection system 1 is moved relative to an inspection object.

In step S202, the position input unit 323 acquires position information of the neutron detection unit 21 and the neutron emission unit 12 and position information of the inspection target.

In step S203, the radiation source output unit 321 controls the linear accelerator 11 to emit a pulsed neutron beam from the neutron emission unit 12.

In step S204, the detector input unit 322 acquires data of the neutron amount detected by the neutron detectors 22a to 22e constituting the neutron detection unit 21, and stores the data in the storage unit 312.

In step S205, the calculation unit 313 compares the acquired data with pre-movement data. The pre-movement data is, for example, a solid line in the graph of FIG. 8. Data derived from the amount of thermal neutrons Nsa before the movement (the first neutron amount at 211a in FIG. 8), which is stored in the storage unit 312, is compared with data derived from the amount of thermal neutrons Nsb' after movement (the second neutron amount at 211b' in FIG. 8), as is shown in FIG. 8.

In step S206, the calculation unit 313 specifies a neutron detector having output a peculiar value through the comparison in step S104. The calculation unit 313 performs data processing for estimating a range of depth, where an abnormal portion exists, from the position of the specified neutron detector.

In step S207, the display unit 314 displays the data processed in step S105 in a visible form to the user.

In step S208, the controller 311 determines whether to terminate the measurement in response to a request from the user. The process is terminated if it is determined to terminate the measurement (Y). If it is not determined to terminate the measurement (N), the process returns to step S201.

<Detection Timing>

The non-destructive inspection system 1 according to the second embodiment can inspect an inspection object while continuously moving. For example, it is supposed that 100 neutron detectors are arranged at intervals of 1 [cm] in an array of 1 [m], and that the incident angle of fast neutrons is 35°. Further, it is supposed that the velocity of thermal neutrons is 2200 [m/s]. In this case, when the vehicle 2 having thereon the non-destructive inspection system 1 moves at a speed of 30 [km/h], detection can be performed by emitting fast neutrons in a pulsed manner at intervals of 1.2 [ms].

Third Embodiment

A third embodiment of the present disclosure will be described below.

Figure 11:
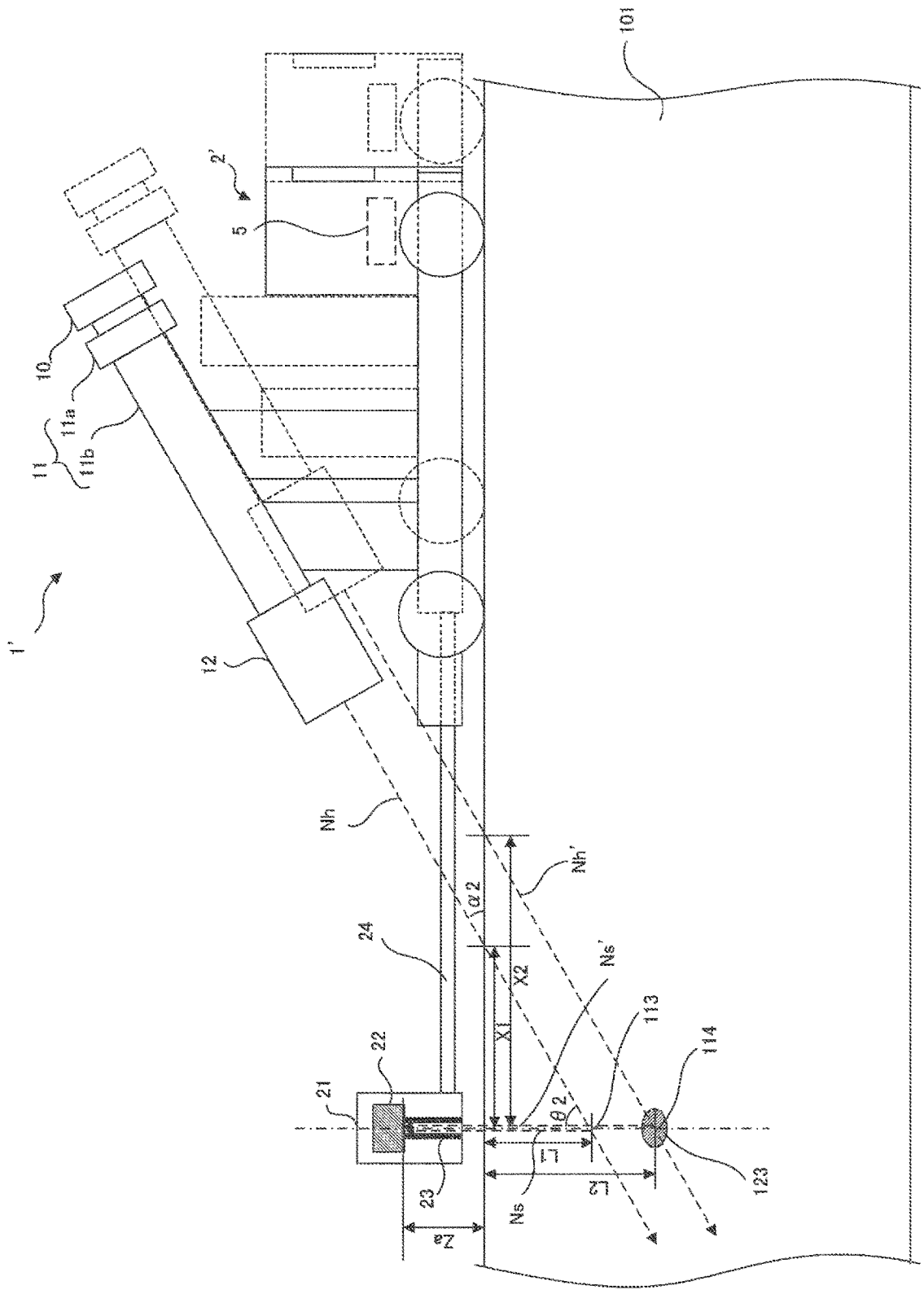
FIG. 11 is a schematic configuration diagram illustrating a non-destructive inspection system according to a third embodiment of the present disclosure.

FIG. 11 is a schematic configuration diagram illustrating a non-destructive inspection system 1' according to the third embodiment of the present disclosure. The same reference characters are given to the same components as those of the first embodiment, and a description thereof is omitted.

The non-destructive inspection system 1' of the third embodiment basically has a single neutron detector 22 and a single collimator 23 in a neutron detection unit 21. Further, the length of the connection unit 24 is variable.

A vehicle 2' is moved so that a neutron emission unit 12 is moved relative to a bridge 101 which is an inspection object. Further, by extending the length of the connection unit 24 according to the movement of the vehicle 2', the relative position of the neutron detection unit 21 with respect to the inspection object can be maintained. The vehicle is moved to change a position where fast neutrons are emitted, so that the fast neutrons can be emitted to a position 113 (first position) and a position 114 (second position) which are two different points along the center axis direction of the collimator 23. When fast neutrons are emitted to the position 113, the fast neutrons incident on the position 113 penetrate X1/cos α2. Since there is no abnormal portion at the position 113, the thermal neutrons generated by the concrete at the position 113 penetrate distances L1 and Za and are detected by the neutron detector 22. Next, a case where an abnormal portion 123 filled with water exists at the position 114 will be considered. When fast neutrons are emitted to the position 114, the fast neutrons incident on the position 114 penetrate X2/cos α2. The position 114 is an abnormal portion 123 filled with water, and thermal neutrons generated and scattered penetrate distances L2 and Za and are detected by the neutron detector 22. If the penetration distance can be specified and the attenuation rates of the fast neutrons and the thermal neutrons can be specified, the neutron detector 22 can calculate the neutron amount expected to be detected at the position 114, based on the value of the neutron amount detected at the position 113. However, since the abnormal portion 123 at the position 114 is filled with water and thermal neutrons are generated more due to scattering, as compared to thermal neutrons generated in concrete, the neutron amount detected by the neutron detector 22 is greater than the neutron amount expected. Therefore, it can be determined that there is an abnormal portion at the depth of the position 114.

Fourth Embodiment

Next, a fourth embodiment of the present disclosure will be described.

Figure 12:
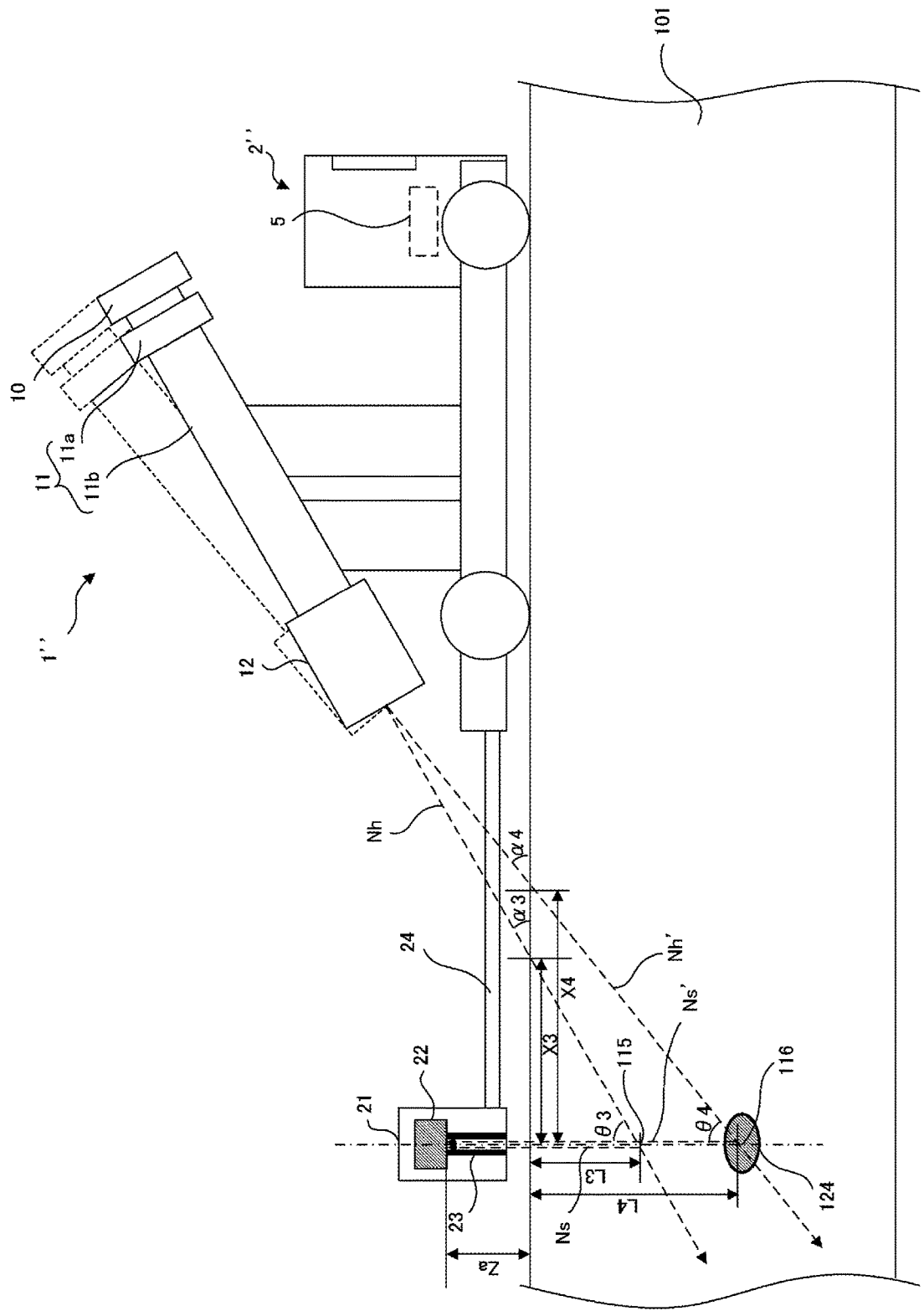
FIG. 12 is a schematic configuration diagram illustrating a non-destructive inspection system according to a fourth embodiment of the present disclosure.

FIG. 12 is a schematic configuration diagram illustrating a non-destructive inspection system 1" according to the fourth embodiment of the present disclosure. The same reference characters are given to the same components as those of the first embodiment, and a description thereof is omitted.

The non-destructive inspection system 1" of the fourth embodiment basically has a single neutron detector 22 and a single collimator 23 in a neutron detection unit 21.

The non-destructive inspection system 1" includes an emission angle changing unit (not illustrated) that changes the emitting direction of the neutron emission unit 12 so as to change an incident angle with respect to the bridge 101 (inspection object) from α3 to α4. By changing the emitting direction of the neutron emission unit, fast neutrons can be emitted to a position 115 (first position) and a position 116 (second position) which are two different points along the center axis direction of the collimator 23. Therefore, an abnormal portion between the depth of the position 115 and the depth of the position 116 can be specified.

The non-destructive inspection system 1" may change the emitting direction of neutrons without physically moving the neutron emission unit 12 or the entire configuration of the linear accelerator 11 by, for example, changing the position of the neutron emission port of the neutron emission unit 12 or bending the direction of the proton beam accelerated by the linear accelerator by magnetic force.

Fifth Embodiment

Next, a fifth embodiment of the present disclosure will be described.

Figure 13:
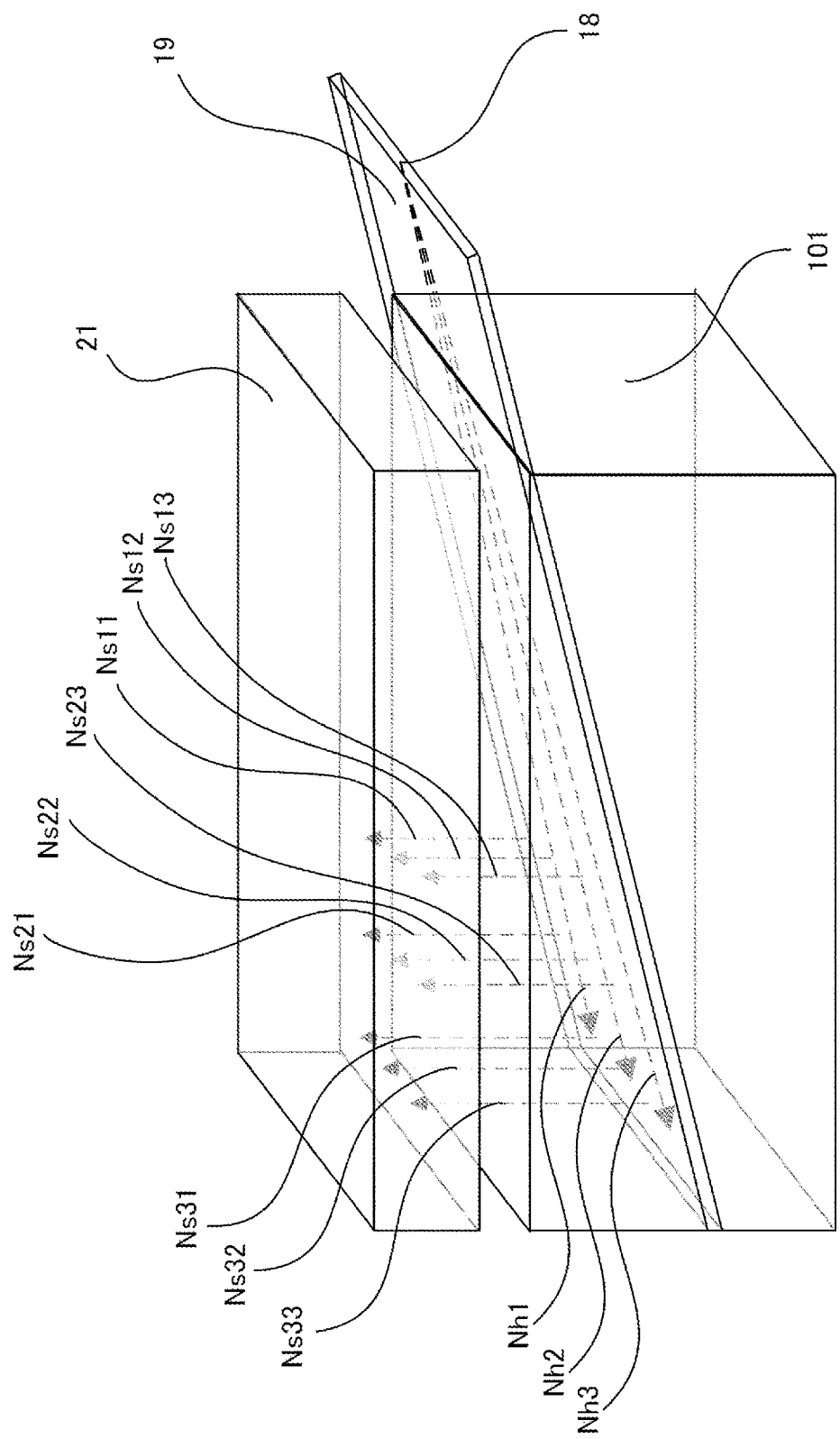
FIG. 13 is a schematic perspective view illustrating a relationship between an inspection object and a neutron detection unit according to a fifth embodiment of the present disclosure.

FIG. 13 is a schematic perspective view illustrating the relationship between the neutron detection unit 21 in a non-destructive inspection system according to the fifth embodiment of the present disclosure and an inspection object.

In the non-destructive inspection system according to the fifth embodiment, the emitting direction is restricted relative to up-down directions of the figure from an emission starting point 18 of the neutron emission unit (not shown), and fast neutrons are emitted so as to have a two-dimensional diffusion angle in the width direction. The emitted fast neutrons enter the inside of the bridge 101 which is the inspection object, while diffusing along the plane 19 in FIG. 13.

In the neutron detection unit 21, a plurality of neutron detectors (not shown) are two-dimensionally arrayed.

The emitted fast neutrons are scattered inside the bridge 101 to generate thermal neutrons. In FIG. 13, generated thermal neutrons indicated by Ns11 to Ns33 are detected by the plurality of neutron detectors of the neutron detection unit 21. Since the fast neutron travels through the bridge 101 while being diffused, for example, the fast neutrons, which is the origin of the scattered thermal neutrons Ns31 and Ns32, penetrate different distances (path lengths) in the inspection object. Therefore, the amount of thermal neutrons Ns31 is less than that of thermal neutrons Ns32. The calculation unit 313 can correct the difference in the neutron amounts attributed to the difference in the path length according to each neutron detector.

According to the fifth embodiment, information of the depth direction in a region having a certain area can be collectively obtained.

The embodiments according to the present disclosure have been described hereinabove, but aspects of the present disclosure are not limited to the embodiments described above.

The non-destructive inspection system can calculate the volume of the abnormal portion using the neutron amounts detected by the neutron detectors, distance information indicating the position of the abnormal portion in the depth direction, and the attenuation rate of the structure.

In the first embodiment to the fifth embodiment, the non-destructive inspection system can specify the position of the abnormal portion in the depth direction. As a result, it is possible to specify the attenuation amount of the thermal neutrons generated at the abnormal portion which attenuate over the distance in the depth direction. Specifically, the attenuation amount can be specified by the attenuation rate (attenuation information) corresponding to the material of the structure and the penetration distance. When the abnormal portion is filled with water, fast neutrons are scattered according to the amount of water, and the amount of thermal neutrons generated changes. That is, the larger the amount of water, the larger the amount of thermal neutrons generated. However, thermal neutrons generated at a deep position decrease due to attenuation according to the distance in the depth direction. As described above, the calculation unit can calculate the volume of the abnormal portion, for example, the volume of water or the volume of air filled in the cavity of the abnormal portion, by using the neutron amounts detected by the neutron detectors, the distance information indicating the position of the abnormal portion in the depth direction, and the attenuation information of the structure through which the neutrons penetrate.

DESCRIPTION OF REFERENCE CHARACTERS 1, 1', 1" Non-Destructive Inspection System
2, 2', 2" Vehicle
5 Control Unit
10 Power Supply Unit
11 Linear Accelerator
12 Neutron Emission Unit
21 Neutron Detection Unit
22, 22a to 22e Neutron Detector
23, 23a to 23e Collimator
24 Connection Unit
31 Position Detection Unit
101 Bridge
311 Controller
312 Storage Unit
313 Calculation Unit
314 Display Unit
321 Radiation Source Output Unit
322 Detector Input Unit
323 Position Input Unit

The invention claimed is:

1. A non-destructive inspection system, comprising:
a neutron emission unit capable of emitting neutrons;
a neutron detector capable of detecting the neutrons emitted from the neutron emission unit and penetrating through an inspection object;
a collimator positioned between the inspection object and the neutron detector and arranged so that the neutrons penetrating through the inspection object enter the neutron detector with a predetermined directivity; and
a calculation unit configured to perform a calculation based on a result detected by the neutron detector,
wherein:
the neutron emission unit emits the neutrons such that a center axis of a neutron emission intersects a center axis direction of the collimator, and
the calculation unit is capable of generating information about the inspection object in the center axis direction of the collimator, based on position information of the neutron detector and/or position information of the neutron emission unit, information about an angle at which the center axis of the neutron emission intersects the center axis direction of the collimator, and a neutron amount detected by the neutron detector.

2. The non-destructive inspection system of claim 1, wherein the neutron emission unit is configured to emit the neutrons such that the center axis of the neutron emission intersects the center axis direction of the collimator at the angle of 10 degrees to 80 degrees.

3. The non-destructive inspection system of claim 2, wherein:
the neutron detector comprises a plurality of detection units,
the calculation unit specifies a detection unit, out of the plurality of detection units, which detects a peculiar neutron amount based on neutron amounts detected by the plurality of detection units.

4. The non-destructive inspection system of claim 2, wherein:
the neutron emission unit is capable of emitting the neutrons toward a first position and a second position, which are differently distanced from the collimator in the center axis direction of the collimator,
the neutron detector is capable of detecting a first neutron amount detected when the neutron emission unit emits the neutrons toward the first position and a second neutron amount detected when the neutron emission unit emits the neutrons toward the second position, and
the calculation unit is capable of generating information about the inspection object between the first position and the second position based on the first neutron amount and the second neutron amount.

5. The non-destructive inspection system of claim 1, wherein:
the neutron detector comprises a plurality of detection units,
the calculation unit specifies a detection unit, out of the plurality of detection units, which detects a peculiar neutron amount based on neutron amounts detected by the plurality of detection units.

6. The non-destructive inspection system of claim 5, wherein the calculation unit generates a fitting curve based on the neutron amounts detected by the plurality of detection units, and specifies the detection unit that detects the peculiar neutron amount based on a difference between the fitting curve and a neutron amount detected by each of the plurality of detection units.

7. The non-destructive inspection system of claim 6, wherein:
the neutron emission unit is capable of emitting the neutrons toward a first position and a second position, which are differently distanced from the collimator in the center axis direction of the collimator,
the neutron detector is capable of detecting a first neutron amount detected when the neutron emission unit emits the neutrons toward the first position and a second neutron amount detected when the neutron emission unit emits the neutrons toward the second position, and
the calculation unit is capable of generating information about the inspection object between the first position and the second position based on the first neutron amount and the second neutron amount.

8. The non-destructive inspection system of claim 5, wherein the calculation unit specifies the detection unit that detects the peculiar neutron amount based on a difference between standard information corresponding to material information of the inspection object and a neutron amount detected by each of the plurality of detection units.

9. The non-destructive inspection system of claim 8, wherein:
the neutron emission unit is capable of emitting the neutrons toward a first position and a second position, which are differently distanced from the collimator in the center axis direction of the collimator,
the neutron detector is capable of detecting a first neutron amount detected when the neutron emission unit emits the neutrons toward the first position and a second neutron amount detected when the neutron emission unit emits the neutrons toward the second position, and
the calculation unit is capable of generating information about the inspection object between the first position and the second position based on the first neutron amount and the second neutron amount.

10. The non-destructive inspection system of claim 5, wherein:
the neutron emission unit is movable relatively to the inspection object, and
the calculation unit specifies the detection unit that detects the peculiar neutron amount, based on the neutron amounts detected by the plurality of detection units before a movement of the neutron emission unit and the neutron amounts detected by the plurality of detection units after the movement of the neutron emission unit.

11. The non-destructive inspection system of claim 5, wherein:
the neutron emission unit is capable of emitting the neutrons toward a first position and a second position, which are differently distanced from the collimator in the center axis direction of the collimator,
the neutron detector is capable of detecting a first neutron amount detected when the neutron emission unit emits the neutrons toward the first position and a second neutron amount detected when the neutron emission unit emits the neutrons toward the second position, and
the calculation unit is capable of generating information about the inspection object between the first position and the second position based on the first neutron amount and the second neutron amount.

12. The non-destructive inspection system of claim 1, wherein:
the neutron emission unit is capable of emitting the neutrons toward a first position and a second position, which are differently distanced from the collimator in the center axis direction of the collimator,
the neutron detector is capable of detecting a first neutron amount detected when the neutron emission unit emits the neutrons toward the first position and a second neutron amount detected when the neutron emission unit emits the neutrons toward the second position, and
the calculation unit is capable of generating information about the inspection object between the first position and the second position based on the first neutron amount and the second neutron amount.

13. The non-destructive inspection system of claim 12, wherein
the neutron emission unit is configured to emit the neutrons to the first position and the second position by changing relative positions of the neutron detector and the neutron emission unit.

14. The non-destructive inspection system of claim 12, wherein
the neutron emission unit is configured to emit the neutrons to the first position and the second position by changing an emitting direction of the neutrons emitted from the neutron emission unit.

15. The non-destructive inspection system of claim 12, wherein:
the neutron detector comprises a first detection unit and a second detection unit,
the first detection unit and the second detection unit are movable with respect to the inspection object while maintaining a relative position with the neutron emission unit,
the first detection unit is capable of detecting the first neutron amount in a case of the neutron emission unit emitting the neutrons toward the first position before a movement of one of the first detection unit or the second detection unit, and
the second detection unit is capable of detecting the second neutron amount in a case of the neutron emission unit emitting the neutrons toward the second position after the movement.

16. The non-destructive inspection system of claim 12, further comprising:
a collimator positioned between the neutron emission unit and the inspection object, wherein:
the neutron detector comprises a plurality of detection units arranged in a two-dimensional direction,
the neutron emission unit emits the neutrons through the collimator that restricts an emitting direction to two-dimensional directions, and
the calculation unit is capable of generating information about the inspection object based on information of a plurality of neutron amounts detected by the plurality of detection units.

17. The non-destructive inspection system of claim 1, wherein
the calculation unit is configured to generate information about a composition of the inspection object between a first position and a second position, which are differently distanced from the collimator in the center axis direction of the collimator, based on a first neutron amount and a second neutron amount.

18. The non-destructive inspection system of claim 1, wherein:
the neutron emission unit is capable of emitting a pulsed neutron beam, and
the calculation unit detects, at a set detection time, time information of the pulsed neutron beam emitted from the neutron emission unit and thermal neutrons detected by the neutron detector, the thermal neutrons being generated when the pulsed neutron beam emitted penetrates through the inspection object.

19. The non-destructive inspection system of claim 1, wherein
the calculation unit is capable of calculating distance information indicating a position of an abnormal portion in the center axis direction of the collimator, based on the position information of the neutron detector and/or the position information of the neutron emission unit, the information about the angle at which the center axis of the neutron emission intersects the center axis direction of the collimator, and the neutron amount detected by the neutron detector, the calculation unit being capable of generating information about a volume of the abnormal portion using the distance information and attenuation information of a structure through which the neutrons penetrate.

20. A non-destructive inspection method implemented by using:
a neutron emission unit capable of emitting neutrons;

a neutron detector capable of detecting the neutrons emitted from the neutron emission unit and penetrating through an inspection object;
a collimator positioned between the inspection object and the neutron detector and arranged so that the neutrons penetrating through the inspection object enter the neutron detector with a predetermined directivity; and
a calculation unit configured to perform a calculation based on a result detected by the neutron detector,
the non-destructive inspection method comprising:
emitting the neutrons, by the neutron emission unit, toward the inspection object such that a center axis of a neutron emission intersects a center axis direction of the collimator;
detecting the neutrons by the neutron detector; and
generating, by the calculation unit, information about the inspection object in the center axis direction of the collimator, based on position information of the neutron detector and/or position information of the neutron emission unit, information about an angle at which the center axis of the neutron emission intersects the center axis direction of the collimator, and a neutron amount detected by the neutron detector.

* * * * *